Sept. 13, 1949.  R. S. YINGLING  2,482,051
ROTARY CHECKING FIXTURE
Filed April 16, 1945  2 Sheets-Sheet 1
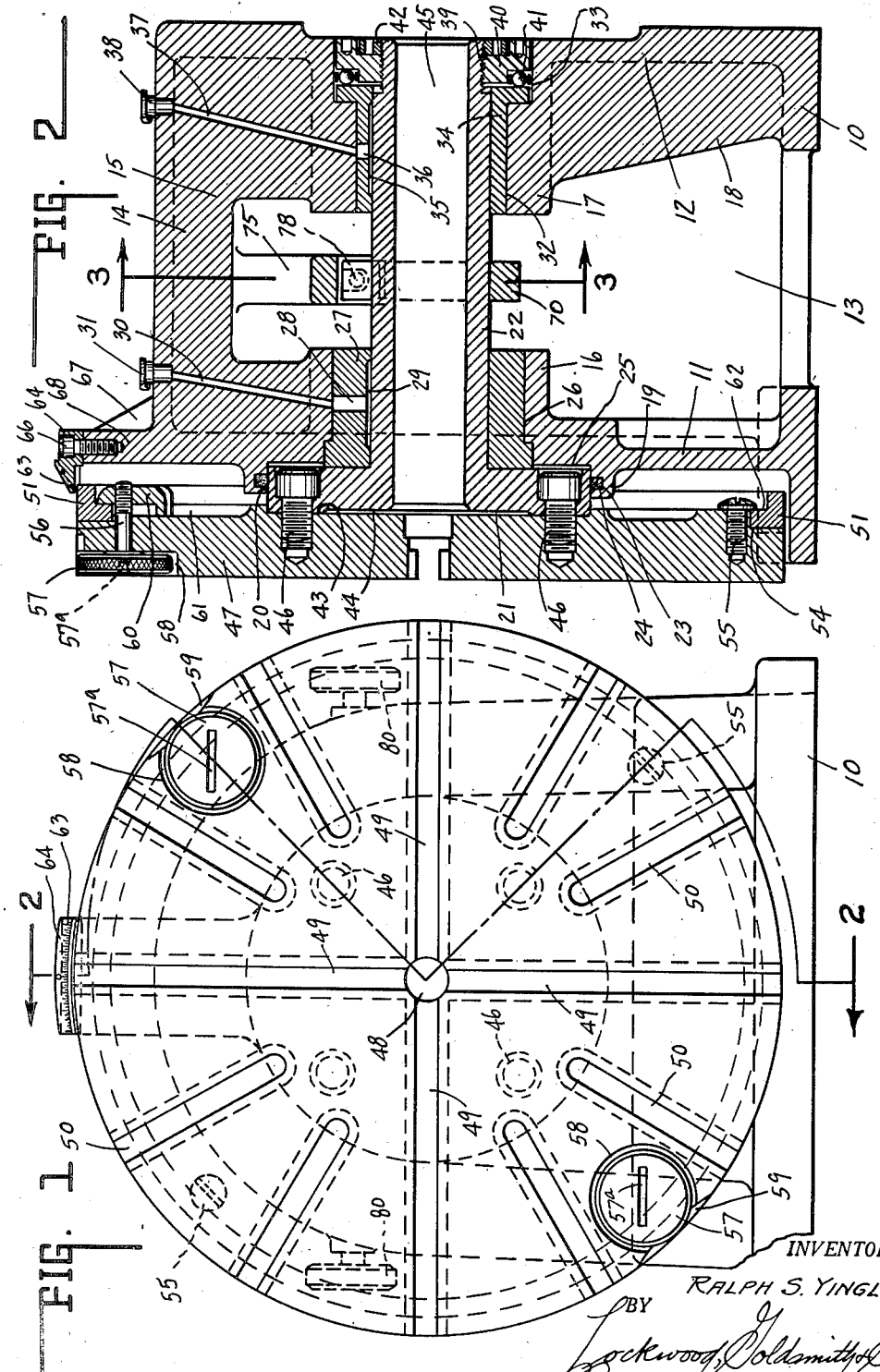
INVENTOR.
RALPH S. YINGLING.
BY
Lockwood, Goldsmith & Galt
ATTORNEYS.

Sept. 13, 1949.                R. S. YINGLING                2,482,051
                            ROTARY CHECKING FIXTURE
Filed April 16, 1945                                       2 Sheets-Sheet 2
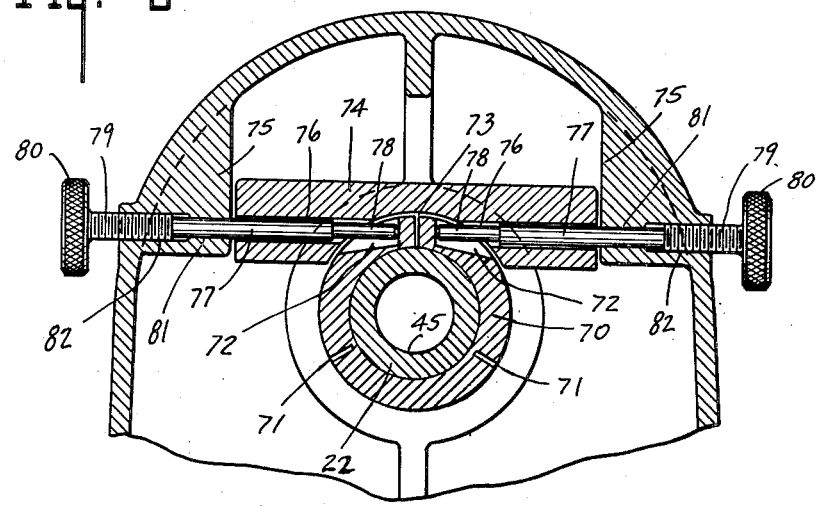
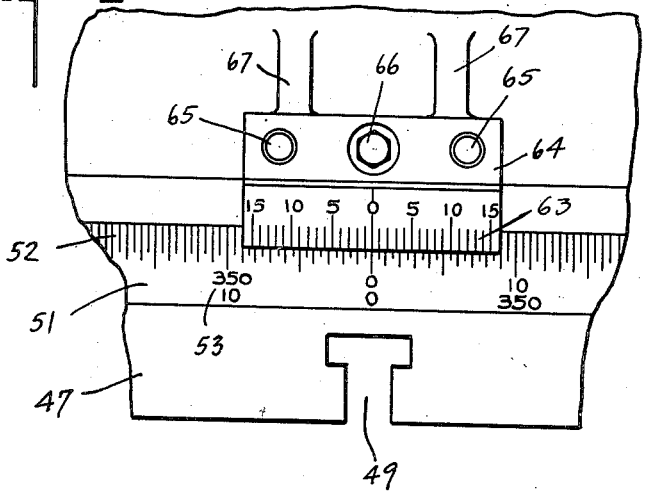
INVENTOR.
RALPH S. YINGLING.
BY
Lockwood, Goldsmith & Galt,
ATTORNEYS.

Patented Sept. 13, 1949

2,482,051

UNITED STATES PATENT OFFICE 2,482,051

ROTARY CHECKING FIXTURE

Ralph S. Yingling, Yorktown, Ind.

Application April 16, 1945, Serial No. 588,583

6 Claims. (Cl. 33—174)

This invention relates to a rotary checking fixture.

The chief object of this invention is to provide a rotary checking fixture which is extremely accurate and which has relatively adjustable parts so that work clamped to the plate can be rotated to a plurality of adjusted positions and the aforesaid parts adjusted for multiple checking without work removal from the plate.

The chief feature of this invention resides in the annularly adjustable scale ring and the vernier associated therewith and the spindle fine adjustment and locking mechanism.

Another feature of this invention resides in the simplicity of construction and positive cooperative character of the parts embodied in the fixture.

Other objects and features of the invention will be set forth more fully hereinafter.

The full nature of the invention will be understood from the accompanying drawings and the following description and claims:

In the drawings, Fig. 1 is a front elevational view looking at the work mounting face plate end of the fixture.

Fig. 2 is a longitudinal sectional view taken on broken line 2—2 of Fig. 1 and in the direction of the arrows.

Fig. 3 is a transverse sectional view taken on line 2—2 of Fig. 1 and in the direction of the arrows.

Fig. 4 is a top plan view of the vernier and degree ring and adjacent portions of the base and face plate.

In Fig. 2 of the drawings, 10 indicates a base portion, which is hollow and integral therewith at the front and rear and rising therefrom are portions 11 and 12 connected by side portions 13 and closed at the top by curved top portion 14. An interior C-shaped reenforcing rib 15 is integral with the top and upper portions of the front and back portions 11 and 12 from which project inwardly, in aligned relation and towards each other, bosses 16 and 17, respectively. The latter is reenforced by rib 18 which is a continuation of rib 15.

The front 11 on its forward face includes forward projection 19 aligned with boss 16. It is recessed as at 20 to rotatably support the head portion 21 of spindle 22. The annular face of the recess is grooved as at 23 to seat seal 24. The rear face of the head is clear of back face 25 of the recess.

Coaxial with said recess and in boss 16 is the stepped bore 26 that receives stepped bushing 27. It is against the forward face of same that the back face of the spindle head 21 bears. Said bushing may have radial bore 28 and longitudinal groove 29 at the spindle receiving surface. A passage 30 in the top 14 and C-web 15 at its outer end has lubricant outlet fixture 31 communicating therewith and by which oil is supplied to the relatively rotatable surfaces of the spindle and bushing.

Coaxial with the bore 26 in boss 16 there is in boss 17 a bore 32 laterally enlarged at its rear end as at 33. A stepped bushing 34 is seated in the same and has channel 35 and radial passage 36 therein. Boss 17, web 15 and top 14 includes passage 37 terminating in fitting 38, all similar to the forward bearing lubrication arrangement.

Spindle 22 at its rear end is reduced and threaded as at 39. Screwed thereon is nut 40 seatable in enlargement 33. Interposed between the head of stepped bushing 34 and nut 40 is the anti-friction device 41. A lock nut 42 secures the nut 40 in adjusted position on spindle 22.

Spindle head 21 has its forward face 43 recessed as at 44. The spindle is hollow as at 45. There projects forwardly from the face 43 the quadrant spaced machine screws 46, same threading into the rear of the rotatable checking plate 47. Said plate is centrally apertured at 48 and includes transverse T-sectioned diametral slots 49 in its forward face. Between slots 49 are the shorter T-sectioned radially disposed slots 50. Slots 49 extend across the rotary plate, while slots 50 extend from the periphery radially inward to the desired degree. There may be any desired number of arcuately spaced radial slots 50 and herein eight are illustrated so that the plate is slotted at thirty degree intervals. Such twelve slots are provided to clamp the work, not shown, to the rotary checking plate 47.

Peripherally exposed rearwardly of the checking plate is angle ring 51 having a degree scale 52 thereon, see Fig. 4, and having oppositely reading numbers 53 as shown. The degree or angle ring 51 is seated in annular groove 54 in the rear outer edge of face plate 47. Screws 55, of which there are at least two diametrically positioned, are secured to the back of face plate 47 and have their heads loosely retaining the ring against axial separation from the plate.

At diametral points and between screws 55 are screw bolts 56 which extend through plate 47 and mount thumb wheels 57 slotted at 57a and which are seated in recesses 58 on the front face of plate 47. Plate periphery is reduced at 59 to expose the knurled head 57 so initial screw tightening can be manually effected and final tightening tool effected by a screw driver. A clamp dog 60 is mounted by each bolt 56 and is seated in recess 61 and bears on the flange 62 of ring 51.

Accordingly, when screws 56—57 are loosened, ring 51 can be annularly adjusted relative to face plate 47 as desired. After work is suitably clamped to the plate 47, the ring is adjusted so that its scale zero, see Fig. 4, matches the zero mark on the vernier scale 63 on vernier plate 64 located by pins 65 and clamped by bolt 66 to a multiple rib 67 reenforced projection 68 on the housing as it were. This vernier permits adjustment to within five seconds of one degree.

Reference will now be had to Figs. 2 and 3. Between the adjacent ends of bosses 16 and 17, and about the spindle 22 exposed therebetween, is a split clamp collar 70, herein having radial kerfs 71 therein and being recessed as at 72 adjacent and at opposite sides of the split 73. Such recessing provides bearing faces. A floating block 74 is interposed between housing bosses 75 and is longitudinally bored as at 76 to take confronting stems 77 terminating in bearing portions 78, same extending into the adjacent recesses 72 and bearing in the faces thereof parallel to the split on clamp 70.

Stem 77 is threaded at 79, near its outer end, and mounts thumb wheel 80. The rib type boss 75 is bored as at 81 and tapped as at 82, as illustrated. This clamp holds the spindle and face plate in adjusted position. By loosening one screw 79—80 and tightening the other, the spindle can be micrometrically rotated in one direction, or oppositely, and by the workman while looking down on the vernier, etc. When the vernier indicates the exact position, both screws 79—80 are tightened.

Now, if the work is to be turned, say fifty degrees, screws 56—57 are loosened, the ring turned that amount and in the required direction. The ring is then locked in that position, the vernier again registering zero. Then screws 79—80 are loosened and the work, plate and ring turned bodily in the desired direction until the ring zero registers with the vernier zero. Then screws 79—80 are retightened or used for micrometric adjustment and then tightened as desired. The work is now turned exactly the required amount, the ring constituting the measuring instrument. Thus, use of protractors in the conventional sense is entirely unnecessary, and removal of work from the plate and reapplication is unnecessary.

By way of explanation, and not in any sense by way of limitation, it has been found satisfactory to use stainless steel for the checking ring and vernier. The spindle and its head may be made of alloy steel, hardened, ground and lapped. The bearings may be made of tool steel, hardened, ground and honed. Face plate and housing, or body, may be semi-steel castings accurately machined and having their confronting faces accurately machined and scraped square with one another so that the face plate is always square within one-tenth of an inch in twelve inches.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. In a rotatable checking plate structure having a base, a spindle rotatably mounted therein, a work supporting plate rigid with the spindle and rotatable relative to the base, the combination of means for holding the plate in stationary position, scale means upon the plate and arcuately adjustable relative to the plate and the base, and means for holding the scale means stationary in adjusted position upon the plate, the plate holding means comprising a split clamp about the spindle, and a pair of inwardly directed base carried opposed members operatively engaging said clamp at opposite sides of and adjacent the split therein.

2. In a rotatable checking plate structure having a base, a spindle rotatably mounted therein, a work supporting plate rigid with the spindle and rotatable relative to the base, the combination of means for holding the plate in stationary position, scale means upon the plate and arcuately adjustable relative to the plate and the base, and means for holding the scale means stationary in adjusted position upon the plate, the plate holding means comprising a split clamp about the spindle, and a pair of inwardly directed base carried opposed members operatively engaging said clamp at opposite sides of and adjacent the split therein, each member being independently movable for spindle clamping and releasing and simultaneously and oppositely movable for micrometric rotatable adjustment of the spindle and plate.

3. In a rotatable checking plate structure having a base, a spindle rotatably mounted therein, a work supporting plate rigid with the spindle and rotatable relative to the base, the combination of means for holding the plate in stationary position, scale means upon the plate and arcuately adjustable relative to the plate and the base, and means for holding the scale means stationary in adjusted position upon the plate, the scale means comprising a scale ring rotatable upon the base, the plate holding means comprising a split clamp about the spindle, and a pair of inwardly directed base carried opposed members operatively engaging said clamp at opposite sides of and adjacent the split therein.

4. In a rotatable checking plate structure having a base, a spindle rotatably mounted therein, a work supporting plate rigid with the spindle and rotatable relative to the base, the combination of means for holding the plate in stationary position, scale means upon the plate and arcuately adjustable relative to the plate and the base, and means for holding the scale means stationary in adjusted position upon the plate, the scale means comprising a scale ring rotatable upon the base, the plate holding means comprising a split clamp about the spindle, and a pair of inwardly directed base carried opposed members operatively engaging said clamp at opposite sides of and adjacent the split therein, each member being independently movable for spindle clamping and releasing and simultaneously and oppositely movable for micrometric rotatable adjustment of the spindle and plate.

5. In a rotatable checking plate structure having a base, a spindle rotatably mounted therein, a work supporting plate rigid with the spindle and rotatable relative to the base, the combination of means for holding the plate in stationary position, scale means upon the plate and arcuately adjustable relative to the plate and the base, and means for holding the scale means stationary in adjusted position upon the plate, the scale means being interposed between the base and plate and rotatably supported on the plate, the plate holding means comprising a split clamp about the spindle, and a pair of inwardly directed base carried opposed members operatively engaging said clamp at opposite sides of and adjacent the split therein.

6. In a rotatable checking plate structure having a base, a spindle rotatably mounted therein, a work supporting plate rigid with the spindle and rotatable relative to the base, the combination of means for holding the plate in stationary position, scale means upon the plate and arcuately adjustable relative to the plate and the base, and means for holding the scale means stationary in adjusted position upon the plate, the scale means being interposed between the base and plate and rotatably supported on the plate, the plate holding means comprising a split clamp about the spindle, and a pair of inwardly directed base carried opposed members operatively engaging said clamp at opposite sides of and adjacent the split therein, each member being independently movable for spindle clamping and releasing and simultaneously and oppositely movable for micrometric rotatable adjustment of the spindle and plate.

RALPH S. YINGLING.

REFERENCES CITED

The following references are of record in the file of this patent:

UNITED STATES PATENTS

| Number | Name | Date |
|---|---|---|
| 1,237,001 | Webber | Aug. 14, 1917 |
| 1,677,396 | Mickel | July 17, 1928 |
| 2,342,539 | Gorton | Feb. 22, 1944 |